US008824621B2

(12) United States Patent
Huq (10) Patent No.: US 8,824,621 B2
(45) Date of Patent: Sep. 2, 2014

(54) DEBRIS FILTER FOR USE IN A NUCLEAR FUEL ASSEMBLY

(75) Inventor: Reazul Huq, Offenbach-Am-Main (DE)

(73) Assignee: Areva NP, Courbevoie (FR)

( * ) Notice: Subject to any disclaimer, the term of this patent is extended or adjusted under 35 U.S.C. 154(b) by 581 days.

(21) Appl. No.: 13/143,015

(22) PCT Filed: Dec. 29, 2009

(86) PCT No.: PCT/EP2009/067980
§ 371 (c)(1),
(2), (4) Date: Jun. 30, 2011

(87) PCT Pub. No.: WO2010/076315
PCT Pub. Date: Jul. 8, 2010

(65) Prior Publication Data
US 2011/0268240 A1 Nov. 3, 2011

(30) Foreign Application Priority Data

Dec. 31, 2008 (EP) .................................... 08306029

(51) Int. Cl.
*G21C 19/307* (2006.01)
*G21C 3/322* (2006.01)
*G21C 3/32* (2006.01)
*G21C 19/00* (2006.01)
*G21C 3/00* (2006.01)

(52) U.S. Cl.
CPC ............ *G21C 3/3206* (2013.01); *G21C 19/307* (2013.01); *Y02E 30/40* (2013.01)
USPC ........... 376/313; 376/308; 376/310; 376/409; 376/426; 376/434; 376/438; 376/439

(58) Field of Classification Search
CPC .............. G21C 3/00; G21C 3/30; G21C 3/32; G21C 3/3206; G21C 3/3213; G21C 3/322; G21C 19/00; G21C 19/28; G21C 19/30; G21C 19/307
USPC ......... 376/308, 310–316, 347, 352, 409, 426, 376/434, 438–444; 976/DIG. 58–DIG. 60, 976/DIG. 71, DIG. 75–DIG. 78, 976/DIG. 244–DIG. 246; 210/513, 521, 522
See application file for complete search history.

(56) References Cited

U.S. PATENT DOCUMENTS 3,746,617 A * 7/1973 Iwao et al. ..................... 376/442
3,809,609 A * 5/1974 Krawiec et al. ............... 376/439

(Continued)

FOREIGN PATENT DOCUMENTS

| DE | 2364928 | 7/1975 | |
| DE | 29615575 | 1/1997 | |
| EP | 0 455 010 | 11/1991 | |
| GB | 1108653 A * | 4/1968 | ................ B04C 9/00 |

*Primary Examiner* — Bernarr Gregory
(74) *Attorney, Agent, or Firm* — Davidson, Davidson & Kappel, LLC (57) ABSTRACT

A filter including a plurality of flow ducts extending in a longitudinal direction and each delimited between one pair of walls is provided. The filter includes deflectors protruding into each duct alternately from the pair of walls with overlapping in the longitudinal direction to define a zigzag shaped flow channel and provided with at least one set of holes aligned in the longitudinal direction to define through the overlapping deflectors a passage for accommodating a lower end pin of a fuel rod.

12 Claims, 8 Drawing Sheets

(56) References Cited

U.S. PATENT DOCUMENTS

| | | | | |
|---|---|---|---|---|
| 3,814,666 A | * | 6/1974 | Calvin | 376/439 |
| 3,820,225 A | * | 6/1974 | Iwao et al. | 376/438 |
| 3,820,226 A | * | 6/1974 | Nakazato | 376/438 |
| 4,077,843 A | * | 3/1978 | Patterson et al. | 376/442 |
| 4,089,741 A | * | 5/1978 | Patterson et al. | 376/439 |
| 4,125,435 A | * | 11/1978 | Jabsen | 376/442 |
| 4,135,972 A | * | 1/1979 | Anthony et al. | 376/442 |
| 4,165,256 A | * | 8/1979 | Jabsen | 376/442 |
| 4,654,194 A | * | 3/1987 | Christiansen et al. | 376/443 |
| 4,684,495 A | * | 8/1987 | Wilson et al. | 376/352 |
| 4,684,496 A | * | 8/1987 | Wilson et al. | 376/352 |
| 4,692,302 A | * | 9/1987 | DeMario et al. | 376/439 |
| 4,758,403 A | * | 7/1988 | Noailly | 376/439 |
| 4,775,510 A | * | 10/1988 | Bryan | 376/439 |
| 4,781,884 A | * | 11/1988 | Anthony | 376/352 |
| 4,844,860 A | * | 7/1989 | Hatfield | 376/439 |
| 4,892,653 A | * | 1/1990 | Latge | 210/521 |
| 4,913,875 A | * | 4/1990 | Johansson et al. | 376/439 |
| 5,030,412 A | * | 7/1991 | Yates et al. | 376/352 |
| 5,345,483 A | * | 9/1994 | Johansson et al. | 376/313 |
| 5,390,220 A | * | 2/1995 | Zuloaga et al. | 376/313 |
| 5,483,564 A | * | 1/1996 | Matzner et al. | 376/352 |
| 5,524,031 A | * | 6/1996 | Kilian | 376/313 |
| 5,528,640 A | * | 6/1996 | Johansson et al. | 376/313 |
| 5,867,551 A | * | 2/1999 | Toshihiko | 376/352 |
| 7,149,272 B2 | * | 12/2006 | Soderlund et al. | 376/313 |
| 8,317,035 B2 | * | 11/2012 | Elkins et al. | 210/521 |

\* cited by examiner

DEBRIS FILTER FOR USE IN A NUCLEAR FUEL ASSEMBLY

The present invention relates to a debris filter for use in a nuclear fuel assembly comprising a bundle of fuel rods to be supplied with a coolant fluid flow, of the type comprising a plurality of flow ducts extending in a longitudinal direction and each delimited between a pair of walls.

BACKGROUND

A nuclear fuel assembly for light water reactor conventionally comprises a bundle of elongated fuel rods extending parallel to each other. In use, the fuel assembly is oriented vertically in a nuclear reactor core and a coolant fluid is caused to flow upwardly between the fuel rods.

Debris might be present in the coolant fluid and damage the fuel rods thus requiring removing or replacing the fuel assembly or damaged fuel rods. In a known manner, a debris trap or filter is placed upstream the bundle of fuel rods to trap debris.

EP 0 455 010 discloses a debris filter having a plurality of flow ducts for allowing coolant fluid to flow upwardly through the debris filter, the ducts being curved to trap debris.

SUMMARY OF THE INVENTION

An object of the invention is to provide a debris filter allowing improved debris trapping namely debris in the form of flexible wires.

To this end, the invention provides a debris filter for nuclear fuel assembly of the above-mentioned type, wherein the filter comprises deflectors protruding into each duct alternately from the pair of walls with overlapping in the longitudinal direction to define a zigzag shaped flow channel and provided with at least one set of holes aligned in the longitudinal direction to define through the overlapping deflectors a passage for accommodating a lower end pin of a fuel rod.

In other embodiments, the debris filter comprises one or several of the following features, taken in isolation or in any technically feasible combination:

it comprises in each duct in register in the longitudinal direction with each passage one cell for accommodating a bottom end cap of a fuel rod;

it comprises at least one spring provided in each cell for transversely and/or longitudinally supporting a bottom end cap accommodated in the cell;

it comprises walls each made up of at least one metallic sheet provided with at least one deflector fold for forming one deflector;

it comprises intermediate walls separating two adjacent ducts and each made up of two metallic sheets provided with deflector folds protruding on opposite faces of the wall;

each intermediate wall is provided with one deflector fold protruding from one of the opposed faces of the wall at a level intermediate two deflector folds protruding from the other one of the opposed faces of the wall;

it comprises deflectors formed by plates secured to the walls at an angle;

it comprises intermediate walls separating two adjacent ducts each provided with at least one deflector plate interlocked with the intermediate wall to form two deflectors each protruding on a respective face of the wall;

it comprises at least one pair of adjacent intermediate walls provided with deflector plates intersecting the corresponding intermediate walls at the same level; and it comprises connection strips interlocked perpendicularly with the walls.

The invention also provides to a nuclear fuel assembly comprising a bundle of fuel rods extending in a longitudinal direction and each comprising a pin at a lower end and a debris filter as defined above, the pin of each fuel rod being accommodated in one passage.

In one embodiment, the nuclear fuel assembly comprises a grid-shaped support plate disposed below the debris filter, said support plate comprising bars defining between them openings, bars being arranged for supporting the fuel rods extending through the passages and openings being arranged to allow coolant flow though the support plate into the channels of the filter.

BRIEF DESCRIPTION OF THE DRAWINGS

The invention and its advantages will be better understood on reading the following description given solely by way of example and with reference to the appended drawings, in which.

DETAILED DESCRIPTION

Figure 1:
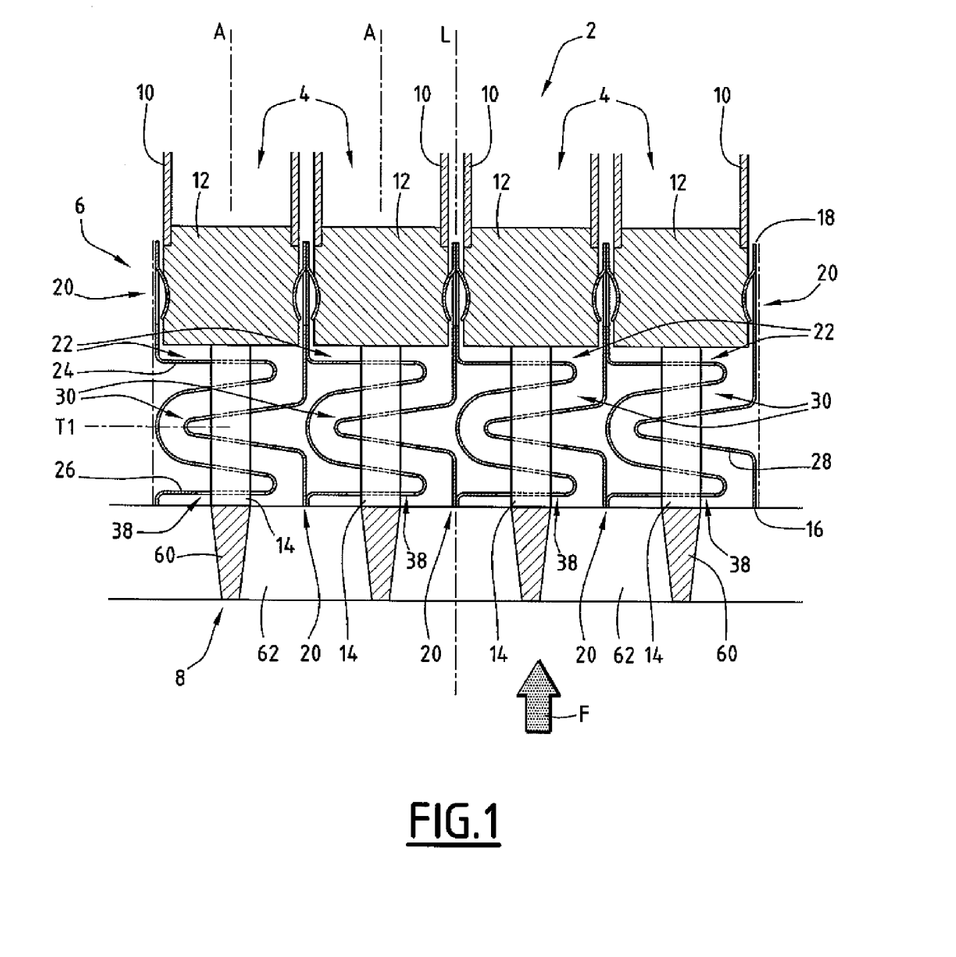
FIG. 1 is a partial sectional view of a lower end portion of a nuclear fuel assembly illustrating a debris filter of the nuclear fuel assembly.

The nuclear fuel assembly 2 of FIG. 1 comprises a bundle of fuel rods 4, a debris filter 6 for filtering debris contained in a coolant fluid supplied to the bundle of fuel rods 4 and a support plate 8 for supporting the filter 6 and the fuel rods 4.

The fuel rods 4 are elongated and extend parallel to each other in a longitudinal direction L. The fuel rods 4 are arranged in a lattice (e.g. a 10×10 lattice) and spaced transversely to allow coolant fluid flow between them mainly in the longitudinal direction L.

In use, the fuel assembly 2 is placed in a nuclear reactor core with the longitudinal direction L substantially vertical and a coolant fluid is supplied to flow mainly upwardly in the longitudinal direction L as illustrated by arrow F on FIG. 1. In the following, the terms relating to orientation refer to the position of the fuel assembly 2 as used in a nuclear reactor core.

Each fuel rod 4 comprises a tubular cladding 10 for receiving a stack of nuclear fuel pellets, a bottom end cap 12 for closing the bottom end of the cladding 10 and a lower pin 14 projecting downwardly from the bottom end cap 12 and of smaller diameter than the bottom end cap 12. Only the lower end portions of four fuel rods 4 are visible on FIG. 1.

The filter 6 is disposed at the bottom end of the bundle of fuel rods 4 and extends transversely. It comprises a lower face 16 and an upper face 18.

The filter 6 comprises walls 20 distributed in a first transverse direction T1 in spaced relationship with a constant pitch P (FIG. 2), each pair of adjacent walls 20 defining between them a duct 22 allowing coolant fluid to flow upwardly through the filter 6.

The walls 20 are elongated and extend parallel to each other in a second transverse direction T2 (FIG. 3) perpendicular to the first transverse direction T1 (i.e. perpendicular to the plane of FIG. 1).

Figure 2:
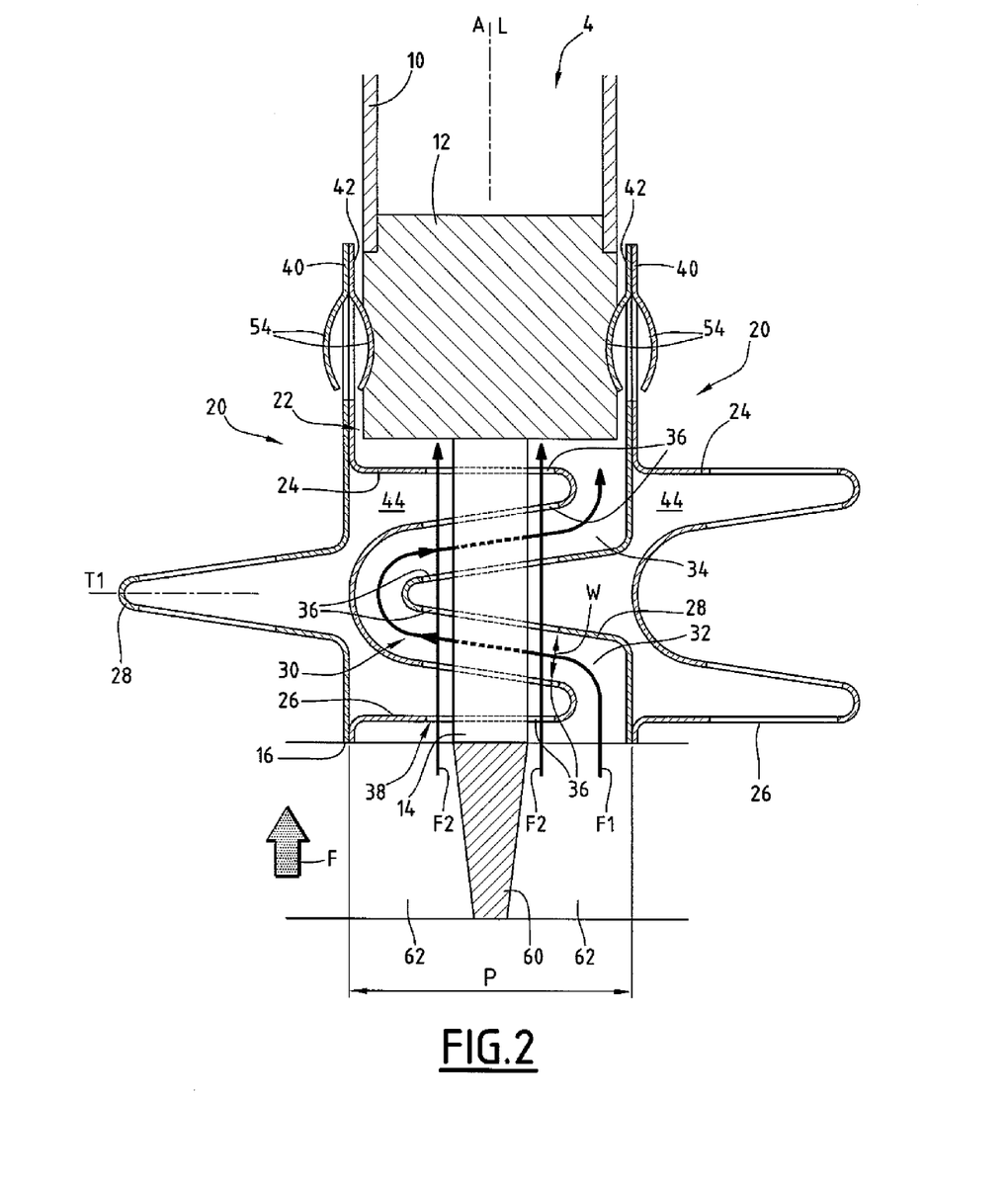
FIG. 2 is an enlarged view of the nuclear fuel assembly lower end portion of FIG. 1.

As illustrated on FIG. 2, each wall 20 is provided with deflectors 24, 26, 28 protruding from the wall 20 transversely towards each adjacent wall 20.

The deflectors 24, 26, 28 protruding in each duct 22 from the pair of confronting adjacent walls 20 defining the duct 22 intermesh with overlapping in the longitudinal direction L to define inside the duct 22 a zigzag shaped flow channel 30.

The expression "zigzag shaped" refers in the context of the invention in a general manner to a non-linear channel having successive sections inclined relative to the longitudinal direction L and extending alternately from one wall of the pair of walls towards the other wall (on the FIG. 2 from right to left and left to right).

The deflectors 24, 26, 28 protruding in each duct 22 are alternated along the longitudinal direction L between one deflector of one wall 20 and one deflector of the other wall 20 of the pair of adjacent and confronting walls 20 defining the duct 22.

Each intermediate wall 20 separating two adjacent ducts 22 is provided with one upper deflector 24 and one lower deflector 26 protruding on one face of the wall 20 with a longitudinal spacing between them, and one intermediate deflector 28 protruding on the opposite face of the wall 20, at a level intermediate that of the upper and lower deflectors 24, 26.

Walls 20 delimiting one single duct 22 comprise either one lower deflector 26 and one upper deflector 24 or one intermediate deflector 28, as illustrated on the right and left on FIG. 1. Such walls 20 are provided e.g. at the ends of the filter 6 or adjacent openings for water channels in the case of a filter to be used in a BWR (Boiling Water Reactor) fuel assembly.

Back to FIG. 2, the pitch P is set such that each intermediate deflector 28 of one wall 20 is inserted between the upper and lower deflectors 24, 26 of one adjacent partition wall 20 with overlapping in the longitudinal direction L.

The deflectors 24, 26, 28 protruding in each duct 22 are spaced longitudinally such that the width W of the channel 30 (defined as the distance between confronting faces of the deflectors 24, 26, 28 defining one channel 30) is smaller that the pitch P.

Each channel 30 comprises two inclined sections 32, 34 extending at an angle relative to the longitudinal direction. L. The channel 30 comprises a lower inclined section 32 extending upwardly and laterally on a first side (on the left on FIG. 2) from the lower face 16 and an upper inclined section 34 extending upwardly and laterally on the opposite side (on the right on FIG. 2) from the lower inclined section 32.

The lower inclined section 32 of each channel 30 is defined between one lower deflector 26 and one intermediate deflector 28 of one pair of adjacent walls 20, and its upper inclined section 34 is defined between one intermediate deflector 28 and one upper deflector 24 of the pair of adjacent walls 20.

In each duct 22, the overlapping deflectors 24, 26, 28 are provided with sets of holes 36 aligned in along a longitudinal axis A to define through the overlapping deflectors 24, 26, 28 passages 38 each for accommodating the pin 14 of a respective fuel rod 4. Each set of aligned holes 36 defines one passage 38.

Passages 38 are distributed in the ducts 22 of the filter 6 correspondingly to the fuel rods 4. Namely, sets of aligned holes 36 are distributed in the overlapping deflectors 24, 26, 28 in each duct 22 along the second transverse direction T2.

The diameter of the holes 36 is adapted such that the pins 14 are received with a clearance in the holes 36 relative to the axis A of the passage 38. An annular flow path is thus defined around each pin 14.

Each inclined section 32, 34 of each channel 30 intersects the passages 38 extending through the deflectors 24, 26, 28 defining the channel 30. Each channel 30 thus intersects twice the corresponding passages 38.

Each intermediate wall 20 separating two adjacent ducts 22 is made up of two metallic sheets 40, 42 mutually secured, the deflectors 24, 26, 28 of the partition wall 20 being made up of folds of the sheets 40, 42. Each such wall 20 comprises a hollow cavity 44 delimited between the folds of the two sheets 40, 42.

Each end wall 20 delimiting one single duct 22 is made up of one metallic sheet or two metallic sheets, one of them being provided with at least one deflector fold.

Figure 3:
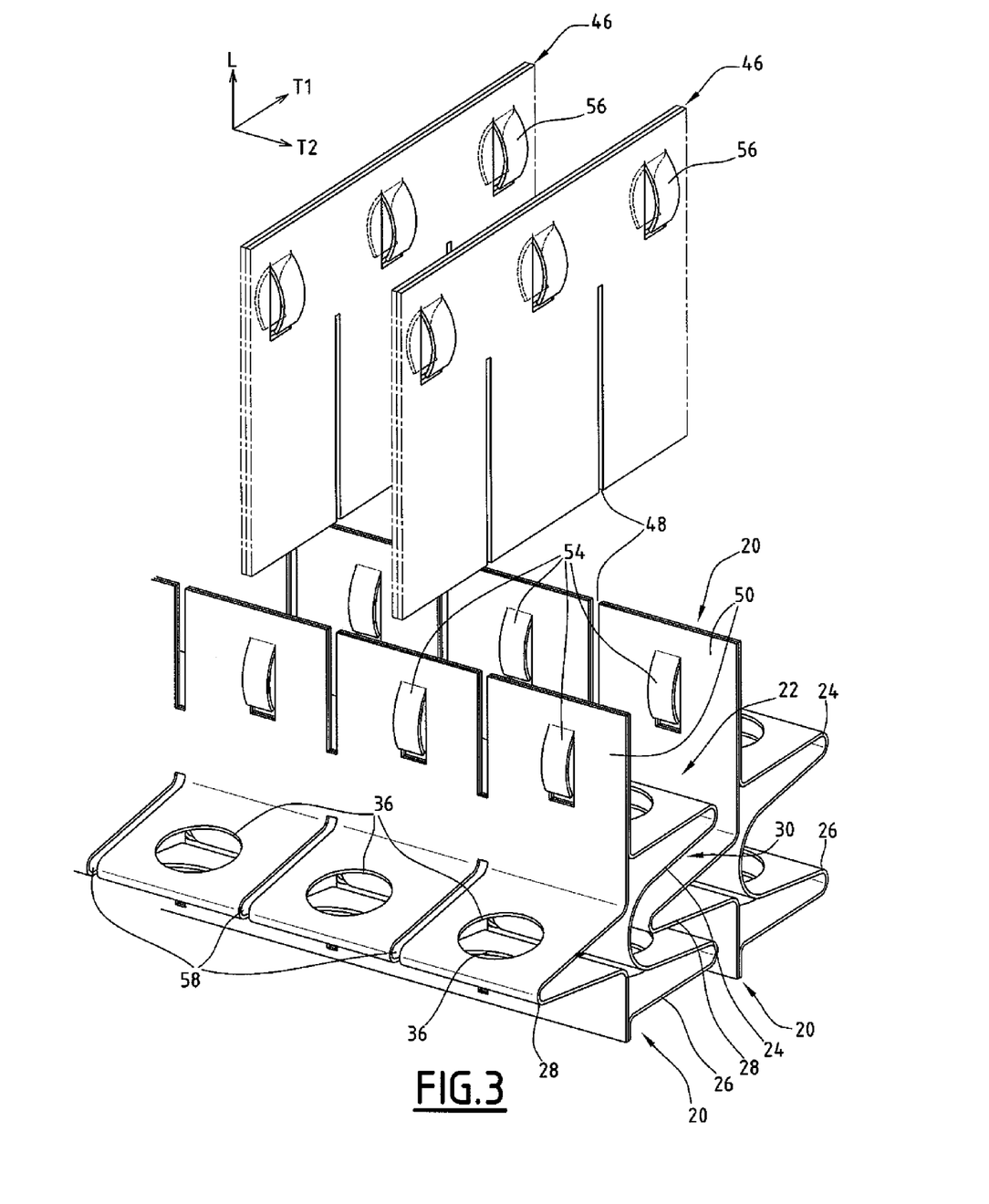
FIGS. 3 and 4 are partial perspective views, respectively exploded and assembled, of the debris filter of FIG. 1.
Figure 4:
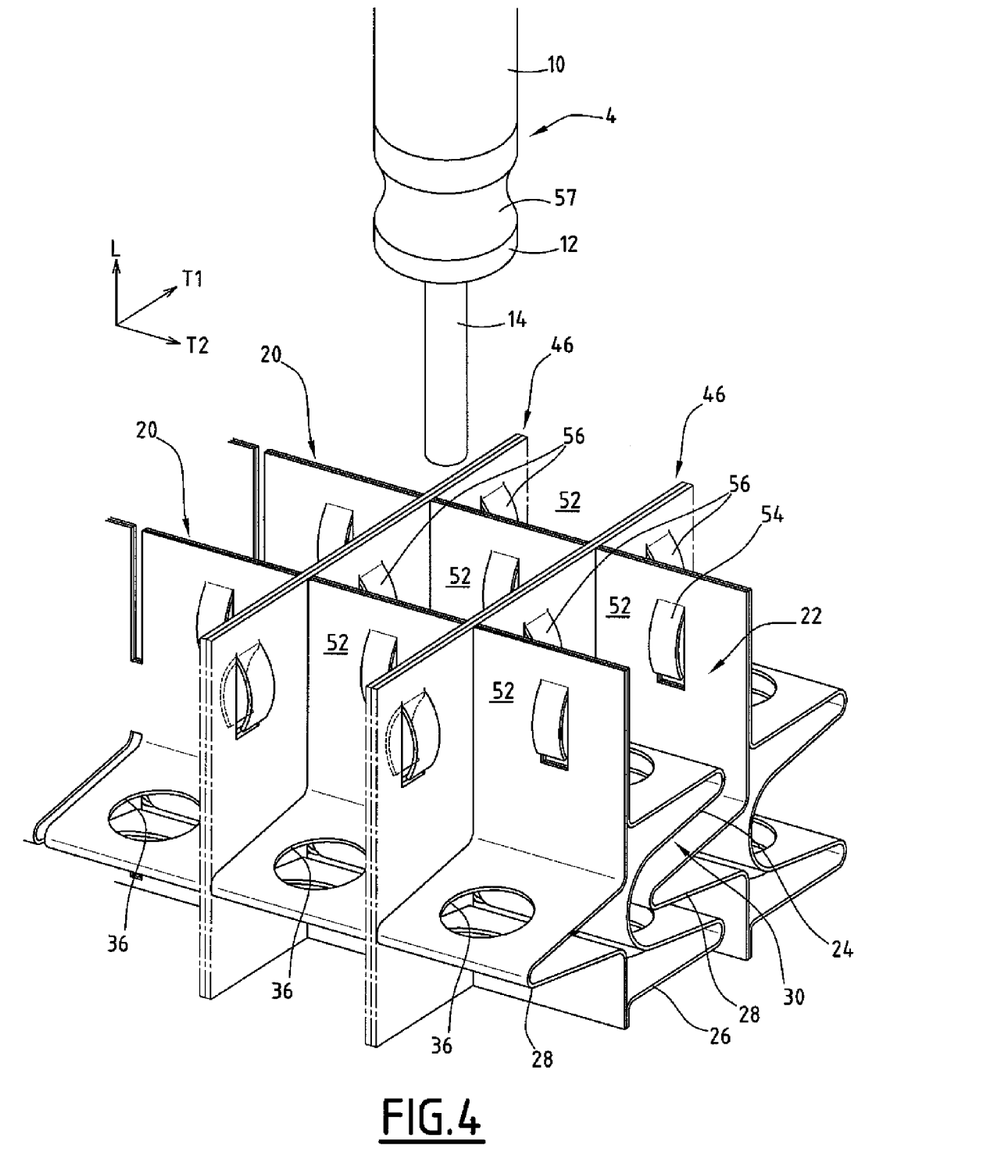

As illustrated on FIGS. 3 and 4, the filter 6 comprises connection strips 46 interlaced at 90° with the walls 20 and conferring to the filter 6 a grid-shaped or latticed structure.

The connection strips 46 and the walls 20 are provided with confronting slots 48 (FIG. 3) of their edges for interlocking the strips 46 with the walls 20.

The walls 20 comprise upper portions 50 extending upwardly from the deflectors 24, 26, 28. The upper portions 50 define with the connection strips 46 a lattice of square shaped cells 52 (FIG. 4). Each cell 52 is aligned with a respective passage 38 and adapted to receive the bottom end cap 12 of a respective fuel rod 4.

The upper portion 50 of the walls 20 and the connection strips 46 are provided with springs respectively 54, 56 for transversely supporting the bottom end caps 12 received in the cells 52 and avoiding lift-off of the fuel rods 4.

The springs 54, 56 are cut out in the faces of each cell 52 defined by the partition walls 20 and the connection strips 46. One spring 54, 56 is provided on each face of the cell 52.

Preferably, each cell 52 is provided with at least two springs in order to secure the fuel rods 4 against undesired vertical movements, partial length BWR fuel rods included. In an alternative embodiment, each cell 52 is provided with one single annular spring assembled to the walls 20 and/or connection strips 46.

As illustrated on FIG. 4, the bottom end caps 12 of the fuel rods 4 are provided with annular grooves 57 and the springs 54, 56 are adapted to extend into the grooves 57.

Each connection strip 46 extends downwardly to the lower edge of the walls 20. The connection strips 46 thus subdivide each channel 30 between each passage 38. To allow insertions of the connection strips 46, the deflectors 24, 26, 28 of each wall 20 are provided with openings 58 (FIG. 3) located between the holes 36.

As illustrated on FIG. 1, the support plate 8 is disposed below the filter 6. It is grid-shaped and comprises bars 60 defining between them openings 62.

Bars 60 of the support plate 8 extend in register with the passages 38 and the pins 14 extending through the passages 38. The bars 60 provide an axial abutment to the pins 14 of the fuel rods 4 and are designed to carry the load of the fuel rods 4, whereby the support plate 8 supports the fuel rods 4.

As illustrated on FIG. 2, the passages 38 and the channels 30 are configured such that the coolant fluid supplied through the openings 62 of the support plate 8 to the lower face 16 of the filter 6 will flow into the channels 30 (arrow F1) and the annular flow paths defined inside the passages 38 around the pins 14 (arrows F2).

Preferably, the dimensions are chosen such that the flow resistance of the channels 30 and that of the annular flow paths are comparable, taking into account the zigzag shape of the channels 30, the width W of the channels 30, the partial obstruction provided by the pins 14 into the channels 30 depending on the diameter of the pins 14, and the clearance between the holes 36 and the pins 14.

In one example, the pin diameter is of approximately 3.5 mm, the diameter of the holes 36 is approximately of 6.5 mm, the radial clearance of approximately 1.5 mm, the width W of the channels 30 is of approximately 2.8 mm, and the pitch P is of approximately 12.65 mm.

In use, the coolant fluid is supplied to the lower face 16 of the filter 6 and flows mainly upwardly in the longitudinal direction L, as illustrated by arrow F on FIG. 1. The coolant fluid flows in each duct 22 by entering the channel 30 (arrow F1) and the annular flow paths (arrow F2) defined in each passage 38 around the pins 14.

The baffled shape of the channels 30 allows catching debris.

The stream flowing through each annular flow path interferes with the stream flowing through the corresponding channel 30. This avoids imparting any preferred orientation to the debris inside the channel 30 and allows enhanced debris retention.

The pins 14 extending in each channel 30 form obstacles perturbing fluid flow in the channel 30 and avoiding clear orientation of the debris.

The fuel rods 4 are secured against lateral shuddering and longitudinal lift-off by the springs 54, 56 provided in each cell 52 defined by the upper portions 50 of the partition walls 20 and the connection strips 46 above the channels 30.

The anti lift-off function is enhanced by the groove 57 for receiving the springs 54, 56 while allowing easy insertion of the fuel rods 4 when assembling the fuel assembly 2.

The pins 14 of the fuel rods 4 accommodated in the passages 38 provided in the filter 6 also contribute to securing the fuel rods against lateral shuddering and longitudinal lift-off.

The cavities 44 defined between the folded deflectors 24, 26, 28 of the sheets 40, 42 also allow trapping debris.

The connection strips 46 subdividing each channel 30 enhance trapping elongated debris oriented in the second transverse direction T2.

The filtering function and the supporting function are operated by the same structure (filter 6) having reduced height. The height of the pin 14 may typically be of approximately 15 mm.

Since the debris filter 6 also fixes the fuel rods 4, it is possible to suppress the conventional first spacer grid located at a distance above the lower end debris filter 6, thus saving costs.

The filter 6 arranged on top of the support plate 8 and adapted to receive the lower end portion of the fuel rods 4 allows providing fuel rods 4 with additional length which could serve as fission gas plenum and/or for increasing the total amount of fissile material of the assembly 2.

Each wall 20 is obtained by providing initially flat sheets 40, 42 pierced with series of holes 36, subsequently folding the sheets 40, 42 to define the deflectors 24, 26, 28 and securing the sheets 40, 42 together. In the flat state, the sheets 40, 42 provided with one single fold are of smaller height than the sheets 40, 42 provided with two folds.

Figure 5:
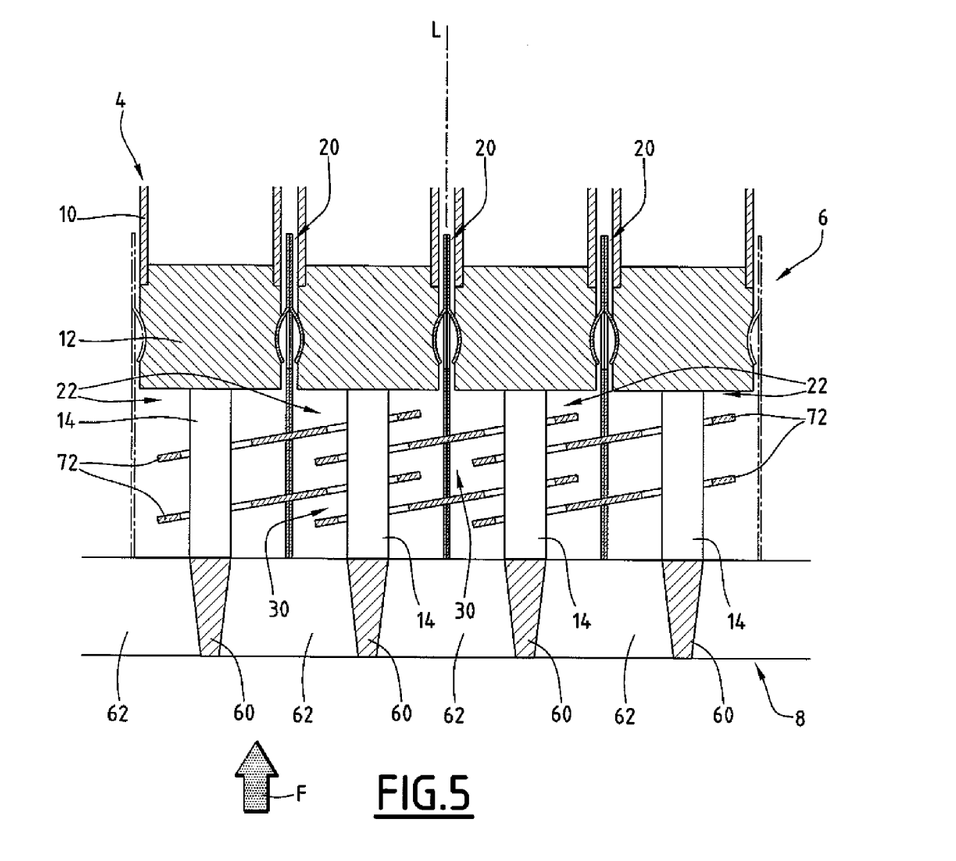
FIG. 5 to 8 are views similar to that of FIGS. 1 to 4, illustrating another embodiment of a debris filter.

The embodiment illustrated on FIG. 5 differs from that of FIGS. 1 to 4 namely by the structure of the walls delimiting the ducts and the deflectors.

In this embodiment, each wall 20 extends parallel to the longitudinal direction L and is provided with two deflector plates 72 interlaced at an angle relative to the wall 20 such that each deflector plate 72 defines two deflectors 74 (FIG. 6) protruding on each side of the wall 20. The two deflector plates 72 are parallel and spaced longitudinally.

Figure 6:
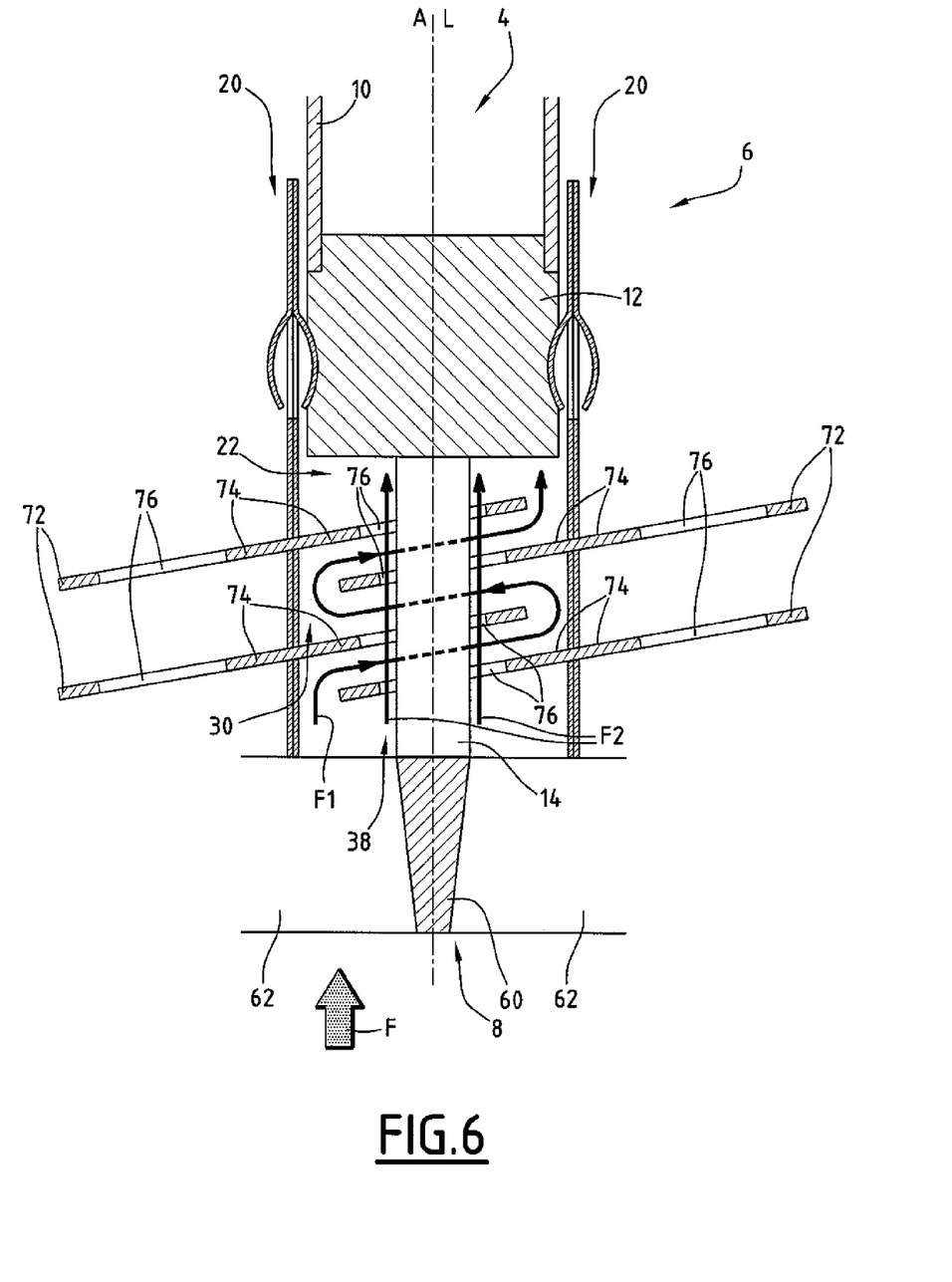

As illustrated on FIG. 6, the deflector plates 72 intersect the walls 20 at an angle inferior to 90° such that each deflector plate 72 defines one deflector 74 extending upwardly on one side of the wall 20 (on the right on FIG. 6) and one deflector 74 extending downwardly on the opposite side of the wall 20 (on the left on FIG. 6).

In each duct 22, downwardly extending deflectors 74 provided on one wall 20 of the pair of adjacent walls 20 delimiting the duct 22 intermeshes and overlaps in the longitudinal direction L with the upwardly extending deflectors 74 provided on the other wall 20 of the pair of adjacent walls 20.

Each channel 30 defined between two adjacent walls 20 is thus zigzag shaped and comprises three inclined sections including one intermediate section extending downwardly.

The deflectors 74 are provided with sets of holes 76 aligned along longitudinal axis A to define passages 38 for receiving the pins 14.

Figure 7:
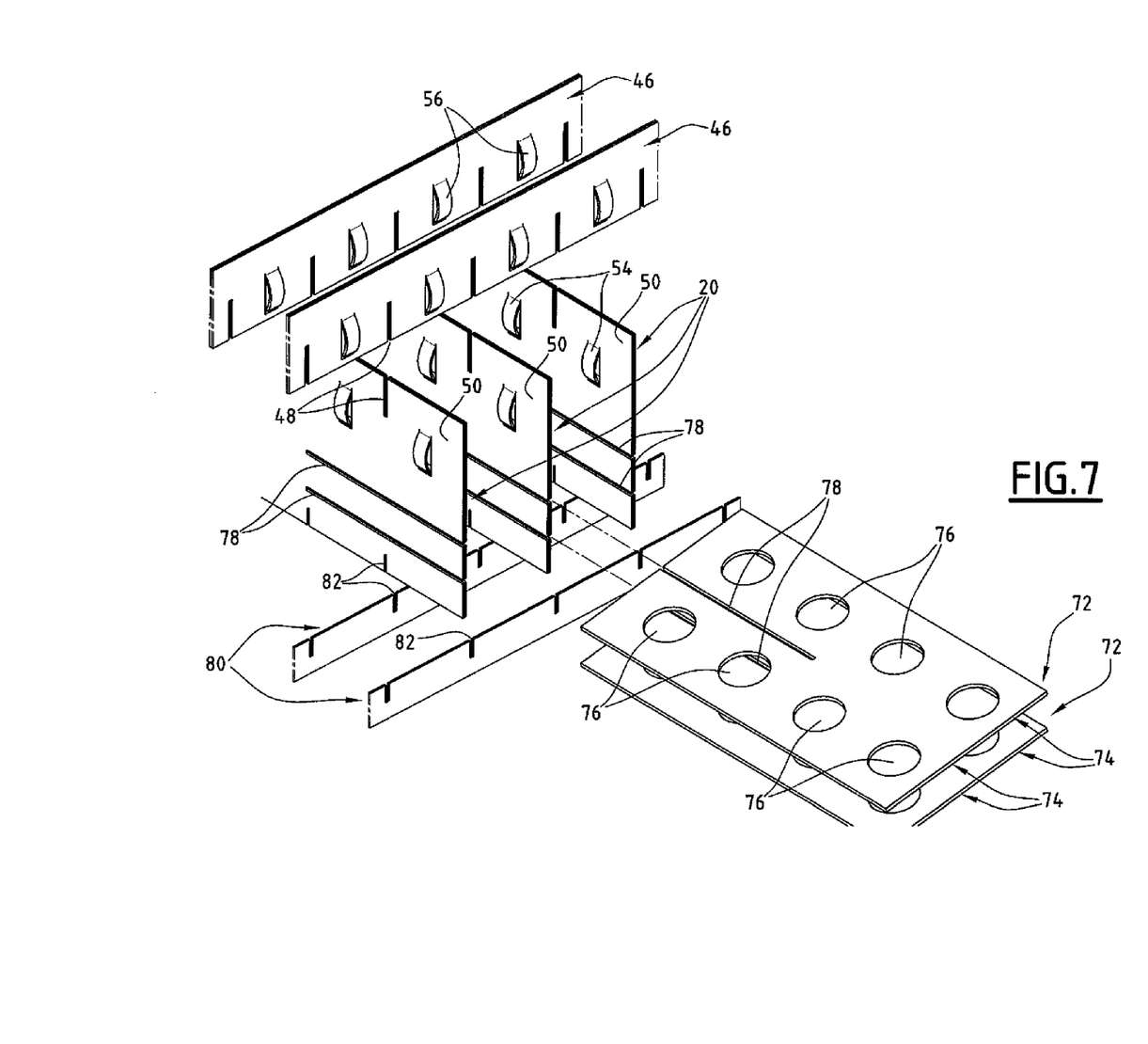
Figure 8:
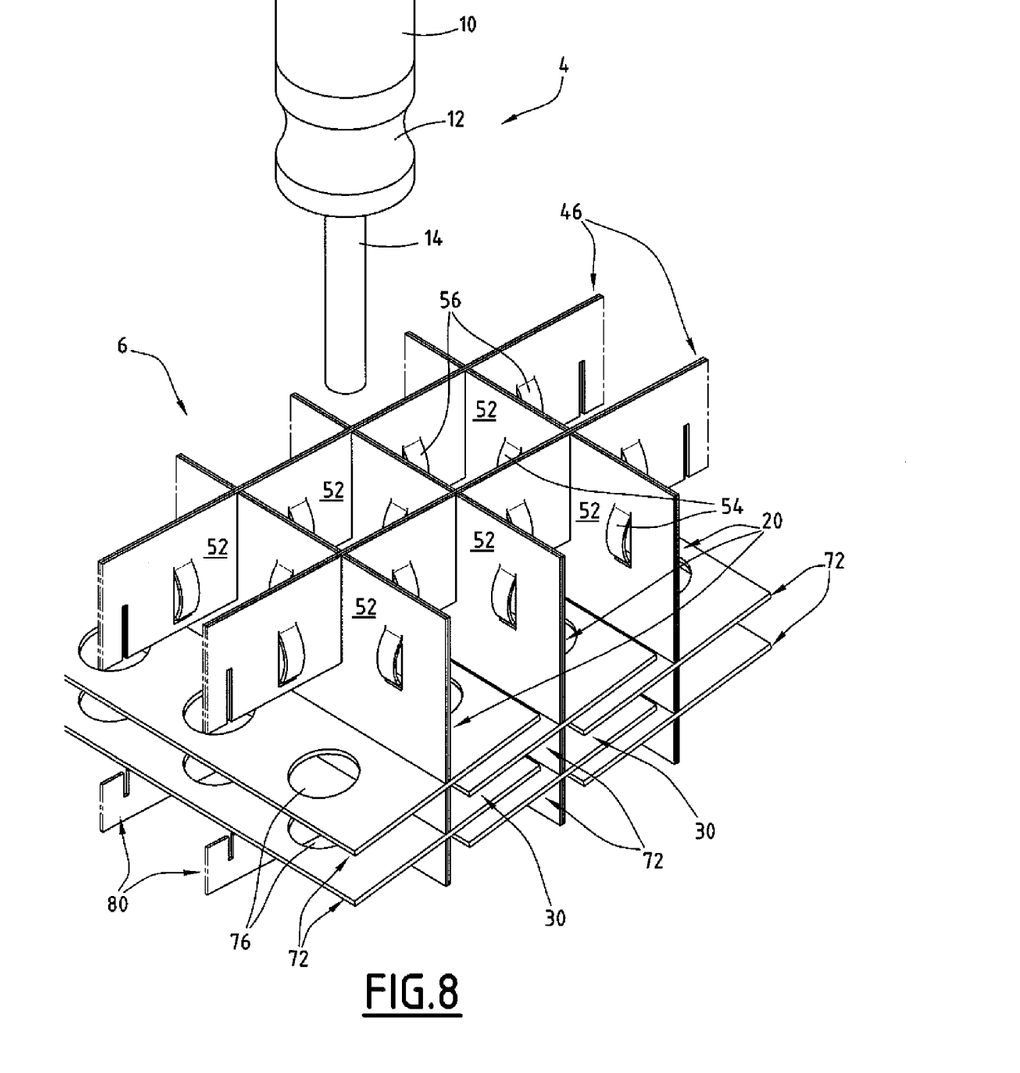

As illustrated on FIG. 7, the filter 6 of the second embodiment has connection strips 46 of smaller height than the walls 20. They are interlocked on the upper edges of the walls 20 and end before the deflectors 74.

The upper portions 50 of the walls 20 and the connection strips 46 are provided with springs 54, 56 for laterally supporting bottom end caps 12 received in cells 52 defined between them and preventing lift-off of the fuel rods 4. For providing springs 54, 56 on each face of the walls 20 or on the connection strips 46, there are formed e.g. of two sheets.

The walls 20 and the deflector plates 72 are provided with confronting interlocking slots 78 extending on half their length in the second transverse direction T2.

Each deflector plate 72 is provided with two parallel series of holes 76, each one extending in a lateral portion of the deflector plate 72 defining a deflector 74, i.e. on each side of the interlocking slot 78.

The length of the walls 20, plates 72, interlocking slots 78 and the number of holes 76 are limited on FIG. 7 for the sake of clarity and correspond in practice to the number of fuel rods 4 in the lattice.

The filter 6 further comprises additional connection strips 80 interlocked on the lower edges of the walls 20 via confronting interlocking slots 82 provided on the lower edges of the walls 20 and the upper edges of the additional connection strips 80.

The filter 6 of FIGS. 5 to 8 offers the same advantages as that of FIGS. 1 to 4 with respect to debris catching, except that the walls 20 are deprived of internal cavities.

The filter 6 of FIGS. 5 to 8 is obtainable simply, at low cost and with good reproducibility from essentially flat metallic sheets.

The sections of the channels of the embodiments of FIGS. 1 to 4 and 5 to 8 are inclined at an angle inferior or superior to 90° relative to the longitudinal direction L. Alternately, at least one section or each section of a channel is at an angle of 90° relative to the longitudinal direction L. This may be obtained in a variant of the filter of FIGS. 5 to 8 by providing deflectors on the walls of each pair of adjacent walls arranged at an angle of 90° relative to the longitudinal direction L and offset in the longitudinal direction L.

The number of sections of the channels of the embodiments of FIGS. 1 to 4 and FIGS. 5 to 8 is not limited to two or three. Alternately or in option, at least one or each channel has a different number of sections, namely two sections, three sections or more than four sections.

In the embodiments of FIGS. 1 to 4 and FIGS. 5 to 8, the walls 20 extend upwardly from the deflectors 24, 26, 28; 74. This allows defining cells 52 for accommodating the bottom end caps 12 and providing springs 54, 56 for laterally supporting said bottom end caps 12.

In a variant, the partition walls are deprived of such springs and in such case, the upper portions of the partition walls can be made shorter above the deflector for limiting the height of the trap while allowing interlocking with connection strips.

In the embodiments of FIGS. 1 to 4 and 5 to 8, the filter is disposed on top of the support plate and the fuel rods extend through the filter and abut onto bars of the support plate. The filter may be disposed below the support plate. In such case, holes for defining passages for accommodating the lower end portions of the fuel rods and/or the upper portions of the walls extending above the deflectors may be omitted. Besides, bars of the support plate are arranged to support the lower end portions of the fuel rods and openings of the support plate are arranged to allow coolant to flow out from the channels of the filter. In option, an additional spacer grid corresponding to the upper portions of the walls may be added on top of the support plate for providing lateral support to the lower end portions of the fuel rods.

Filters such as that of FIGS. 1 to 4 and 5 to 8 but deprived of passages for the fuel rods and/or springs for lateral support of the fuel rods still have the advantage of a simple and low cost construction.

The filters of FIGS. 1 to 4 and 5 to 8 are described for the sake of clarity for a lattice of fuel rods.

In a known manner, a Pressurized Water Reactor (PWR) fuel assembly comprises guide tubes for accommodating cluster rods and may comprise an instrumentation tube for accommodating the core instrumentation. Such tubes replacing some of the fuel rods in the lattice do not comprise fissile material and the filter is adapted to provide specific positions for receiving the tubes.

A fuel assembly for a BWR conventionally comprises at least one water channel replacing one or several fuel rods in the lattice of fuel rods and the filter is adapted for allowing passage of such water channel through the filter as in spacer grids distributed along the fuel rods.

The filter of the invention is usable for fuel assembly of various types, such as fuel assemblies for use in BWR (Boiling Water Reactor) or PWR (Pressurized Water Reactor).

What is claimed is:

1. A debris filter for use in a nuclear fuel assembly comprising a bundle of fuel rods to be supplied with a coolant fluid flow, the filter comprising:
   a plurality of walls defining a plurality of flow ducts extending in a longitudinal direction, each duct being delimited between a pair of the walls; and
   deflectors protruding into each duct alternately from the corresponding pair of walls and overlapping in the longitudinal direction to define a zigzag shaped flow channel in each duct, the overlapping deflectors in each duct being provided with a set of holes aligned in the longitudinal direction to define through the overlapping deflectors a passage for accommodating a lower end pin of one of the fuel rods.

2. The debris filter according to claim 1, further comprising each duct in register in the longitudinal direction with each passage, one cell for accommodating a bottom end cap of a fuel rod.

3. The debris filter according to claim 2, wherein each cell comprises at least one spring for at least one of transversely and longitudinally supporting the bottom end cap accommodated in the cell.

4. The debris filter according to claim 1, wherein the walls are each made up of at least one metallic sheet provided with at least one deflector fold for forming one deflector.

5. The debris filter according to claim 4, further comprising intermediate walls separating two adjacent ducts and each intermediate wall being made up of two metallic sheets provided with deflector folds protruding on opposite faces of the intermediate wall.

6. The debris filter according to claim 5, wherein each intermediate wall is provided with one deflector fold protruding from one of the opposed faces of the intermediate wall at a level intermediate to two deflector folds protruding from the other one of the opposed faces of the intermediate wall.

7. The debris filter according to claim 1, wherein the deflectors are plates secured to the walls at an angle.

8. The debris filter according to claim 7, comprising intermediate walls separating two adjacent ducts each provided with at least one deflector plate interlocked with the intermediate wall to form two deflectors each protruding on a respective face of the wall.

9. The debris filter according to claim 8, comprising at least one pair of adjacent intermediate walls provided with deflector plates intersecting the corresponding intermediate walls at the same level.

10. The debris filter according to claim 1, further comprising connection strips interlocked perpendicularly with the walls.

11. Nuclear fuel assembly comprising a bundle of fuel rods extending in a longitudinal direction and each fuel rod comprising a pin at a lower end and a debris filter according to claim 1, the pin of each fuel rod being accommodated in one passage.

12. The nuclear fuel assembly according to claim 11, further comprising a grid-shaped support plate disposed below the debris filter, the support plate comprising bars defining between them openings, the bars being arranged for supporting the fuel rods extending through the passages and the openings being arranged to allow coolant flow though the support plate into channels of the filter.

* * * * *